United States Patent
Hung et al.

(10) Patent No.: US 9,089,249 B2
(45) Date of Patent: Jul. 28, 2015

(54) DIRECTION DEVICE AND OPERATION SYSTEM UTILIZING THE SAME

(75) Inventors: Shih-Che Hung, Hsinchu (TW);
Hong-Lun Liu, Hualien County (TW);
Yi-Chih Yeh, New Taipei (TW)

(73) Assignee: MSI COMPUTER (SHENZHEN) CO., LTD., Shenzhen (CN)

( * ) Notice: Subject to any disclaimer, the term of this patent is extended or adjusted under 35 U.S.C. 154(b) by 244 days.

(21) Appl. No.: 13/044,050

(22) Filed: Mar. 9, 2011

(65) Prior Publication Data
US 2011/0295447 A1  Dec. 1, 2011

(30) Foreign Application Priority Data
May 25, 2010 (TW) ................................ 99116634 A (51) Int. Cl.
*A47L 9/28* (2006.01)
*G05D 1/02* (2006.01)

(52) U.S. Cl.
CPC .............. *A47L 9/2805* (2013.01); *A47L 9/2852* (2013.01); *A47L 9/2894* (2013.01); *G05D 1/0225* (2013.01); *G05D 1/0234* (2013.01); *A47L 2201/00* (2013.01); *A47L 2201/04* (2013.01); *G05D 2201/0203* (2013.01)

(58) Field of Classification Search
CPC ......... G06F 21/30; G06F 21/50; G06F 21/51; G06F 21/52; G06F 21/53; G06F 21/54; G06F 21/57; G05D 1/0234; G05D 1/0225; G05D 2201/0203; A47L 9/2805; A47L 9/2852; A47L 9/2894; A47L 2201/00; A47L 2201/04

USPC ......... 701/2, 3, 19, 21, 22, 23, 26, 36, 50, 90, 701/70
See application file for complete search history.

(56) References Cited

U.S. PATENT DOCUMENTS

| | | | | |
|---|---|---|---|---|
| 4,986,384 A | * | 1/1991 | Okamoto et al. | 180/167 |
| 5,353,224 A | * | 10/1994 | Lee et al. | 701/25 |
| 6,166,627 A | * | 12/2000 | Reeley | 340/426.25 |
| 6,690,134 B1 | * | 2/2004 | Jones et al. | 318/567 |

(Continued)

FOREIGN PATENT DOCUMENTS

| | | | |
|---|---|---|---|
| EP | 1331537 A1 | * | 7/2003 |
| JP | 2007-520012 A | | 7/2007 |

(Continued)

OTHER PUBLICATIONS

"Radio_frequency"; http://en.wikipedia.org/wiki/Radio_frequency; Retrieved Aug. 27, 2014.*

(Continued)

*Primary Examiner* — James Trammell
*Assistant Examiner* — James E Stroud
(74) *Attorney, Agent, or Firm* — Birch, Stewart, Kolasch & Birch, LLP (57) ABSTRACT

A direction device controlling a traveling route of a cleaning robot and including a receiving unit, an emitting unit and a control unit is disclosed. The receiving unit receives an encoded ultrasonic wave emitted by the cleaning robot. The emitting unit emits at least one wireless signal. The control unit activates the emitting unit to emit a first direction wireless signal when the receiving unit receives the encoded ultrasonic wave. The cleaning robot passes according to the first direction wireless signal.

20 Claims, 5 Drawing Sheets

(56) References Cited

U.S. PATENT DOCUMENTS

| | | | |
|---|---|---|---|
| 7,117,067 B2* | 10/2006 | McLurkin et al. | 700/245 |
| 7,188,000 B2* | 3/2007 | Chiappetta et al. | 700/245 |
| 2007/0244610 A1* | 10/2007 | Ozick et al. | 701/23 |
| 2008/0039974 A1* | 2/2008 | Sandin et al. | 700/258 |
| 2008/0058987 A1* | 3/2008 | Ozick et al. | 700/250 |
| 2008/0282494 A1* | 11/2008 | Won et al. | 15/319 |
| 2011/0295424 A1* | 12/2011 | Johnson et al. | 700/248 |

FOREIGN PATENT DOCUMENTS

| | | |
|---|---|---|
| JP | 2009-518715 A | 5/2009 |
| TW | 200722023 | 6/2007 |

OTHER PUBLICATIONS

"Ultrasonic_sensor"; http://en.wikipedia.org/wiki/Ultrasonic_sensor; Retrieved Aug. 27, 2014.*

* cited by examiner

DIRECTION DEVICE AND OPERATION SYSTEM UTILIZING THE SAME

CROSS REFERENCE TO RELATED APPLICATIONS

This Application claims priority of Taiwan Patent Application No. 099116634, filed on May 25, 2010, the entirety of which is incorporated by reference herein.

BACKGROUND OF THE INVENTION

1. Field of the Invention

The invention relates to an operation system, and more particularly to an operation system with a cleaning robot.

2. Description of the Related Art

A variety of movable robots, which generally include a driving means, a sensor and a travel controller, and perform many useful functions while autonomously operating, have been developed. For example, a cleaning robot for the home, is a cleaning device that sucks dust and dirt from the floor of a room while autonomously moving around the room without user manipulation.

BRIEF SUMMARY OF THE INVENTION

In accordance with an embodiment, a direction device, which controls a traveling route of a cleaning robot, comprises a receiving unit, an emitting unit and a control unit. The receiving unit receives an encoded ultrasonic wave emitted by the cleaning robot. The emitting unit emits at least one wireless signal. The control unit activates the emitting unit to emit a first direction wireless signal when the receiving unit receives the encoded ultrasonic wave. The cleaning robot passes according to the first direction wireless signal.

In accordance with another embodiment, an operation system comprises a cleaning robot and a direction device. The cleaning robot executes a clean procedure and comprises a first emitting unit. The first emitting unit emits a first encoded ultrasonic wave. The direction device comprises a receiving unit, a second emitting unit and a control unit. The receiving unit receives the first encoded ultrasonic wave. The second emitting unit emits at least one wireless signal. The control unit activates the second emitting unit to emit a first direction wireless signal when the receiving unit receives the first encoded ultrasonic wave. The cleaning robot passes according to the first direction wireless signal.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
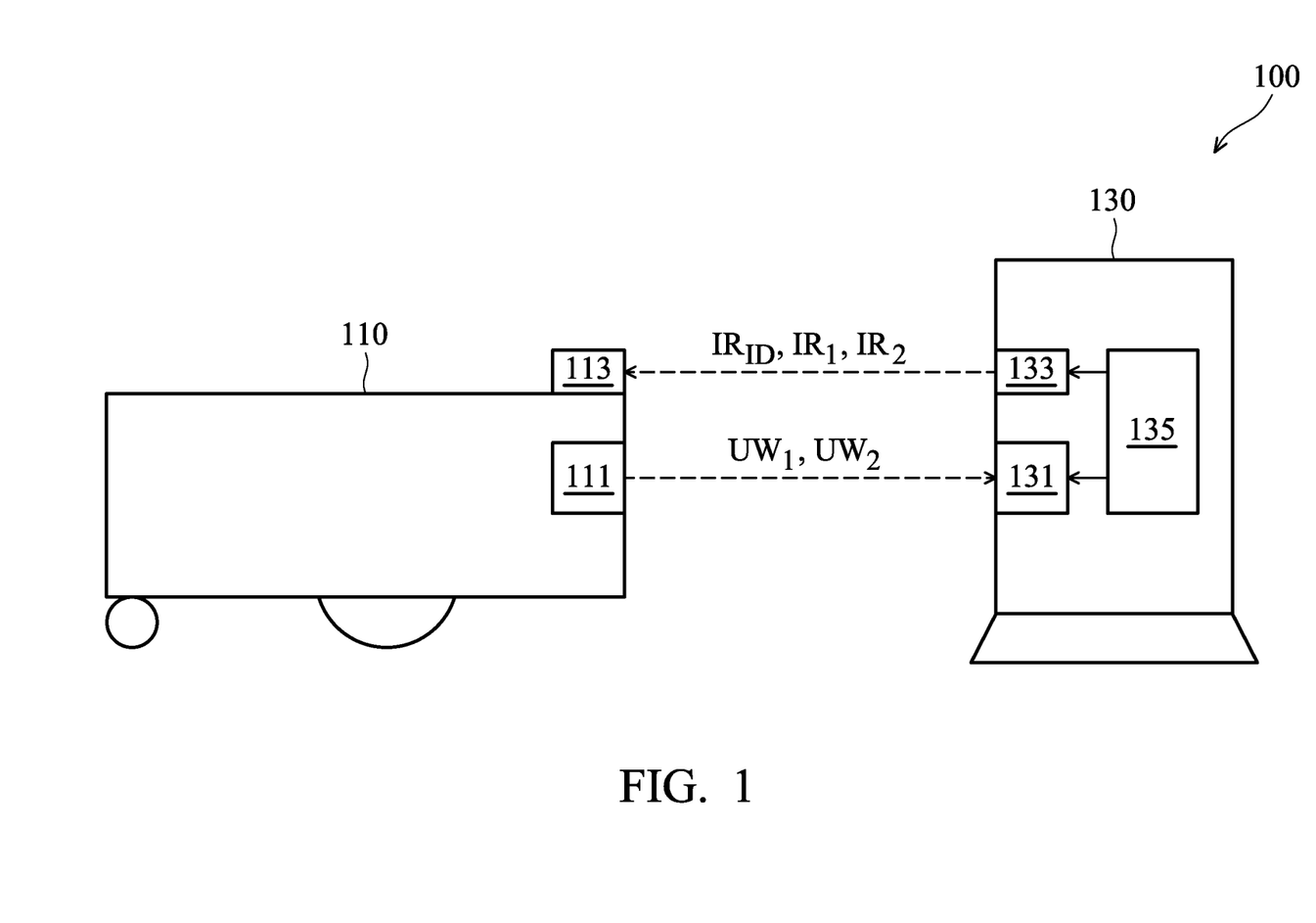
FIG. 1 is a schematic diagram of an exemplary embodiment of an operation system of the invention.

FIG. 1 is a schematic diagram of an exemplary embodiment of an operation system of the invention. The operation system 100 comprises a cleaning robot 110 and a direction device 130. The cleaning robot 110 executes a clean procedure. In this embodiment, the traveling route of the cleaning robot 110 is controlled by the direction device 130. The direction device 130 can simultaneously or respectively serve as one or a combination of a dock, a light house and a virtual wall.

As shown in FIG. 1, the cleaning robot 110 comprises an emitting unit 111 and a receiving unit 113. The emitting unit 111 emits wireless signals. The receiving unit 113 receives wireless signals. The invention does not limit the kind of emitted wireless signals and received wireless signals. In one embodiment, the emitted wireless signals and the received wireless signals are ultrasonic waves or infrared rays.

In one embodiment, the kind of emitted wireless signals is the same as the kind of received wireless signals. For example, the emitted wireless signals emitted by the emitting unit 111 are ultrasonic waves, and the received wireless signals received by the receiving unit 113 are ultrasonic waves. In other embodiments, the emitted wireless signals emitted by the emitting unit 111 are infrared rays, and the received wireless signals received by the receiving unit 113 are infrared rays.

In another embodiment, the kind of emitted wireless signals is different from the kind of received wireless signals. For example, the emitted wireless signals emitted by the emitting unit 111 are infrared rays, and the received wireless signals received by the receiving unit 113 are ultrasonic waves. In other embodiments, the emitted wireless signals emitted by the emitting unit 111 are ultrasonic waves, and the received wireless signals received by the receiving unit 113 are infrared rays.

In this embodiment, the emitting unit 111 is an ultrasonic wave emitter, and the receiving unit 113 is an infrared ray emitter. The emitting unit 111 emits encoded ultrasonic waves, such as $UW_1$ or $UW_2$. The encoded value of the encoded ultrasonic wave $UW_1$ is different from the encoded value of the encoded ultrasonic wave $UW_2$. Methods of encoding the ultrasonic wave are well known to those skilled in the field such that the descriptions of the methods are omitted for brevity.

The transmittal distance of the ultrasonic wave is far, and the ultrasonic wave can overcome blocks. Thus, efficiency of the cleaning procedure can be increased if the ultrasonic wave is utilized in the cleaning robot. Furthermore, the ultrasonic wave is utilized to determine whether blocks occur in the front of the cleaning robot such that the cleaning robot does not directly collide with the blocks. Thus, undesired sound is not generated when the cleaning robot executes the cleaning procedure. Additionally, the ultrasonic wave has high stability and accuracy, and light, such as solar light, does not cause interference with the ultrasonic wave.

In this embodiment, the direction device 130 comprises a receiving unit 131, an emitting unit 133 and a control unit 135. The receiving unit 131 can receive the encoded ultrasonic wave ($UW_1$ or $UW_2$) emitted by the emitting unit 111. Since the encoded ultrasonic wave emitted by the emitting unit 111 comprises a specific encoded value, the receiving unit 131 can determine whether the encoded ultrasonic wave has been emitted by the emitting unit 111 of the cleaning robot 110 according to the specific encoded value of the encoded ultrasonic wave. The receiving unit 131 does not receive other encoded ultrasonic waves, which are emitted by other surrounding devices close to the receiving unit 131.

The emitting unit 133 emits at least one wireless signal, such as $IR_{IR}$, $IR_1$ and $IR_2$. The invention does not limit the kind of wireless signal emitted from the emitting unit 133. In one embodiment, the wireless signal is an ultrasonic wave or an infrared ray. In this embodiment, the emitting unit 133 emits infrared rays $IR_{IR}$, $IR_1$ and $IR_2$. The infrared rays $IR_{IR}$, $IR_1$ and $IR_2$ are encoded and comprise different encoded values. Since methods of encoding the infrared rays are well known to those skilled in the field, the descriptions of the methods are omitted for brevity.

The control unit 135 controls the receiving unit 131 and the emitting unit 133. In one embodiment, the control unit 135 is a micro-controller unit (MCU). When the receiving unit 131 receives the encoded ultrasonic wave $UW_1$, the control device 135 activates the emitting unit 133 to emit a direction wireless signal $IR_1$. The cleaning robot 110 passes according to the direction wireless signal $IR_1$.

In one embodiment, after emitting the direction wireless signal $IR_1$, the cleaning robot 110 moves and is close to the direction device 130. Thus, the receiving unit 133 can accurately receive the encoded ultrasonic wave $UW_1$ emitted by the cleaning robot 110.

After the receiving unit 133 receives the encoded ultrasonic wave $UW_1$, the control unit 135 again activates the emitting unit 133 according to the intensity or the encoded value of the ultrasonic wave $UW_1$ such that the emitting unit 133 emits the direction wireless signal $IR_2$ to control the traveling route of the cleaning robot 110.

In this embodiment, the cleaning robot 110 comprises an omni-directional mirror such that the direction wireless signal $IR_1$ or $IR_2$ can be easily received by the receiving unit 133. Additionally, the intensity of the direction wireless signal $IR_1$ may be different from the intensity of the direction wireless signal $IR_2$. In other embodiment, the encoded value of the direction wireless signal $IR_1$ may be different from the encoded value of the direction wireless signal $IR_2$.

In another embodiment, if the receiving unit 131 has not received the encoded ultrasonic wave $UW_1$ yet, the control unit 135 de-activates the emitting unit 133. Thus, the emitting unit 133 does not emit the wireless signals, such as $IR_{ID}$, $IR_1$ and $IR_2$. The control unit 135 will only activate the emitting unit 133 when the receiving unit 131 receives the encoded ultrasonic wave $UW_1$. The direction device 130 does not emit wireless signals until the encoded ultrasonic wave $UW_1$ is received. Thus, the power consumption of the operation system 100 is reduced because the direction device 130 does not continuously emit wireless signals.

In other embodiments, when the receiving unit 131 has not received the encoded ultrasonic wave $UW_1$ yet, the control unit 135 activates the emitting unit 133 to emit a recognition wireless signal $IR_{ID}$. When the cleaning robot 110 receives the recognition wireless signal $IR_{ID}$, the cleaning robot 110 determines that the direction device is not a block. Thus, the cleaning robot 110 moves and operates according to the wireless signal emitted by the direction device 130.

For example, after receiving the recognition wireless signal IRID, the cleaning robot 110 moves to be close to the direction device 130. Thus, the receiving unit 131 can receive the encoded ultrasonic wave $UW_1$ provided by the cleaning robot 110.

When the receiving unit 131 receives the encoded ultrasonic wave $UW_1$, the emitting unit 133 emits a direction wireless signal $IR_1$. The cleaning robot 110 obtains the distance between the cleaning robot 110 and the direction device 130 according to the direction wireless signal $IR_1$. The cleaning robot 110 executes specific functions according to the distance between the cleaning robot 110 and the direction device 130.

In this case, the cleaning robot 110 depends on the direction wireless signal $IR_1$ to determine the position of the direction device 130. Thus, when electric quantity of the cleaning robot 110 is insufficient, the cleaning robot 110 moves to be close to the direction device 130 such that the direction device 130 charges the cleaning robot 110.

For example, assume the direction device 130 is capable of charging the cleaning robot 110. The direction wireless signal $IR_1$ directs the cleaning robot 110 to be close to the direction device 130, and then the cleaning robot 110 is charged by the direction device 130. Assume the direction device 130 cannot charge the cleaning robot 110. The direction device 130 emits the direction wireless signal $IR_1$ such that the cleaning robot 110 moves and is close to a charging position according to the direction wireless signal $IR_1$. When the cleaning robot 110 reaches the charging position, the cleaning robot 110 can be charged.

In another embodiment, if the electric quantity of the cleaning robot 110 is sufficient, the direction device 130 emits the direction wireless signal $IR_1$ to direct the cleaning robot 110. The cleaning robot 110 is directed according to the direction wireless signal $IR_1$ and then executes a cleaning procedure in another space.

Figure 2A:
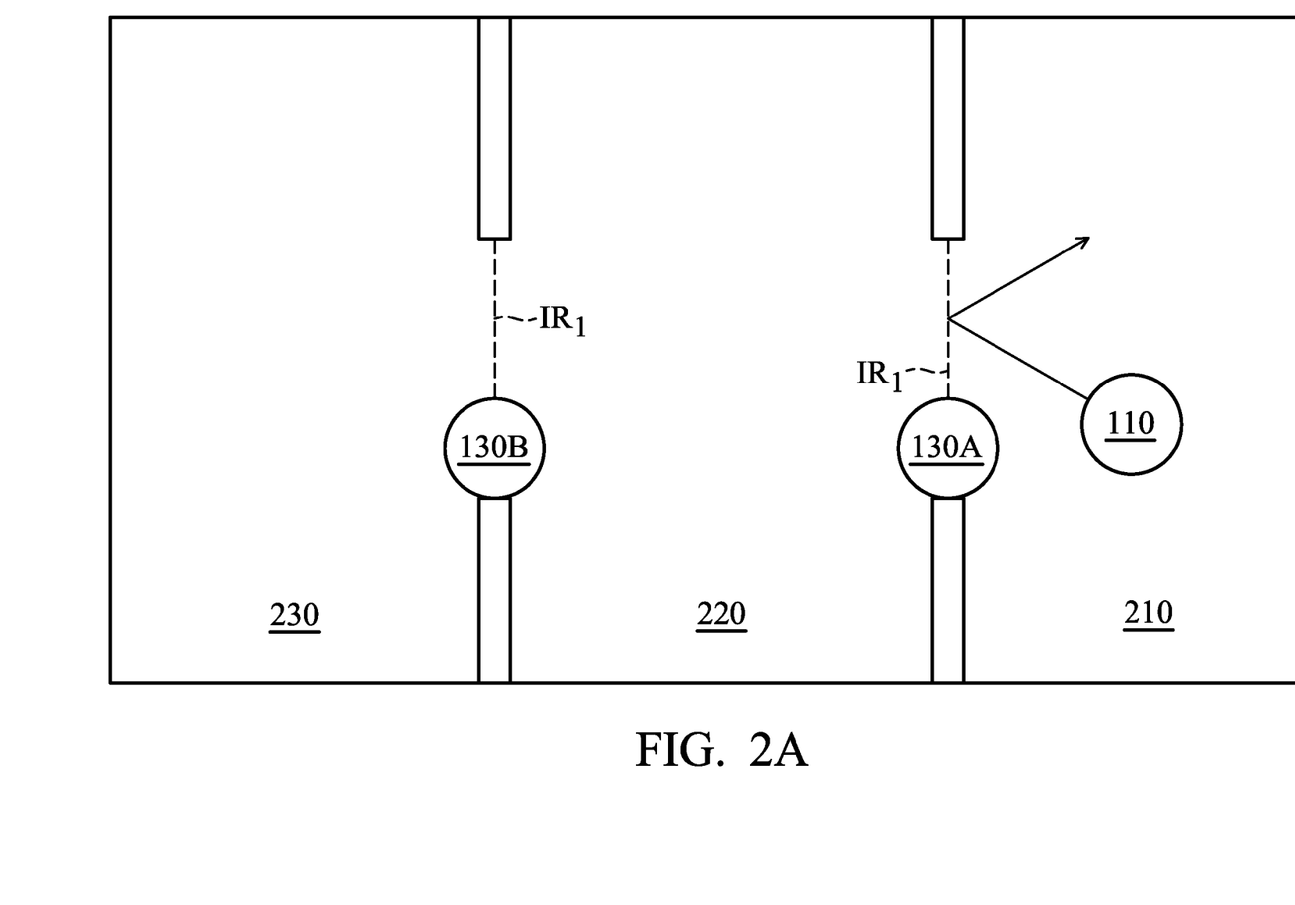
FIGS. 2A-2C is operating schematic diagram of the operation system of the invention.

For example, the direction device 130 can be disposed between two regions for controlling the cleaning robot such that the cleaning robot executes a cleaning procedure the two regions. Refer to FIG. 2A, when the cleaning robot 110 executes a cleaning procedure in the region 210, the direction device 130A emits a direction wireless signal $IR_1$. When the cleaning robot 110 receives the direction wireless signal $IR_1$, the cleaning robot 110 determines that the direction device 130A is a wall. Thus, the cleaning robot 110 does not exit the region 210. In this case, the direction device 130A serves as a virtual wall. Thus, the cleaning robot 110 continually executes the cleaning procedure in the region 210.

Figure 2B:
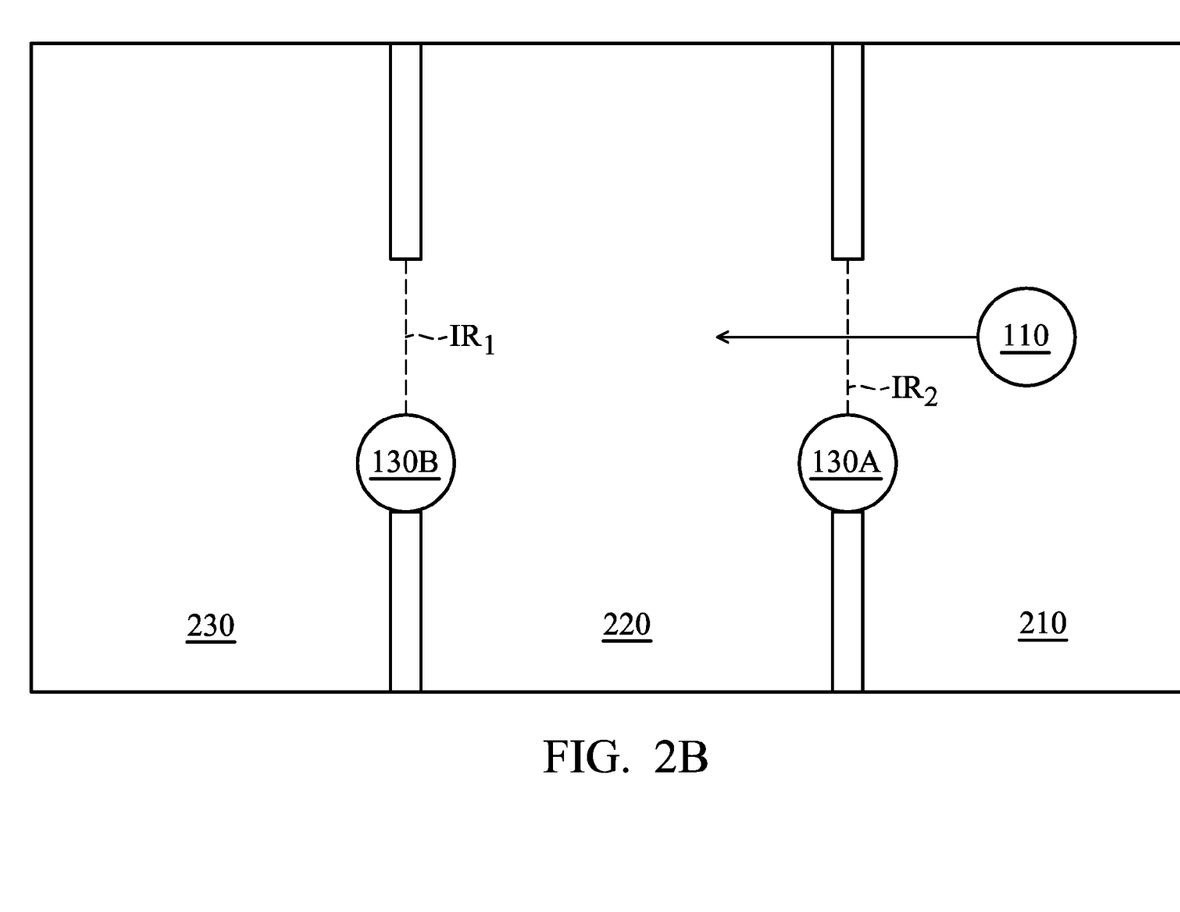

Refer to FIG. 2B, when the cleaning robot 110 finishes the cleaning procedure in the region 210, the emitting unit 111 of the cleaning robot 110 emits the encoded ultrasonic wave $UW_2$. When the direction device 130A receives the encoded ultrasonic wave $UW_2$, the direction device 130A emits the direction wireless signal $IR_2$. The cleaning robot 110 exits the region 210 according to the direction wireless signal $IR_2$. The cleaning robot 110 enters and executes a cleaning procedure in the region 220.

In this embodiment, the encoded value of the direction wireless signal $IR_1$ is different from the encoded value of the direction wireless signal $IR_2$. Additionally, the encoded value of the encoded ultrasonic wave $UW_1$ is different from the encoded value of the encoded ultrasonic wave $UW_2$.

When the cleaning robot 110 enters the region 220, each of the direction devices 130A and 130B emits the guidance signal $IR_1$ such that the cleaning robot 110 determines that the direction devices 130A and 130B are walls. Thus, the cleaning robot 110 does not exit the region 220 and the cleaning robot 110 continually executes a cleaning procedure in the region 220. At this time, the cleaning robot 110 emits the encoded ultrasonic wave $UW_1$.

Figure 2C:
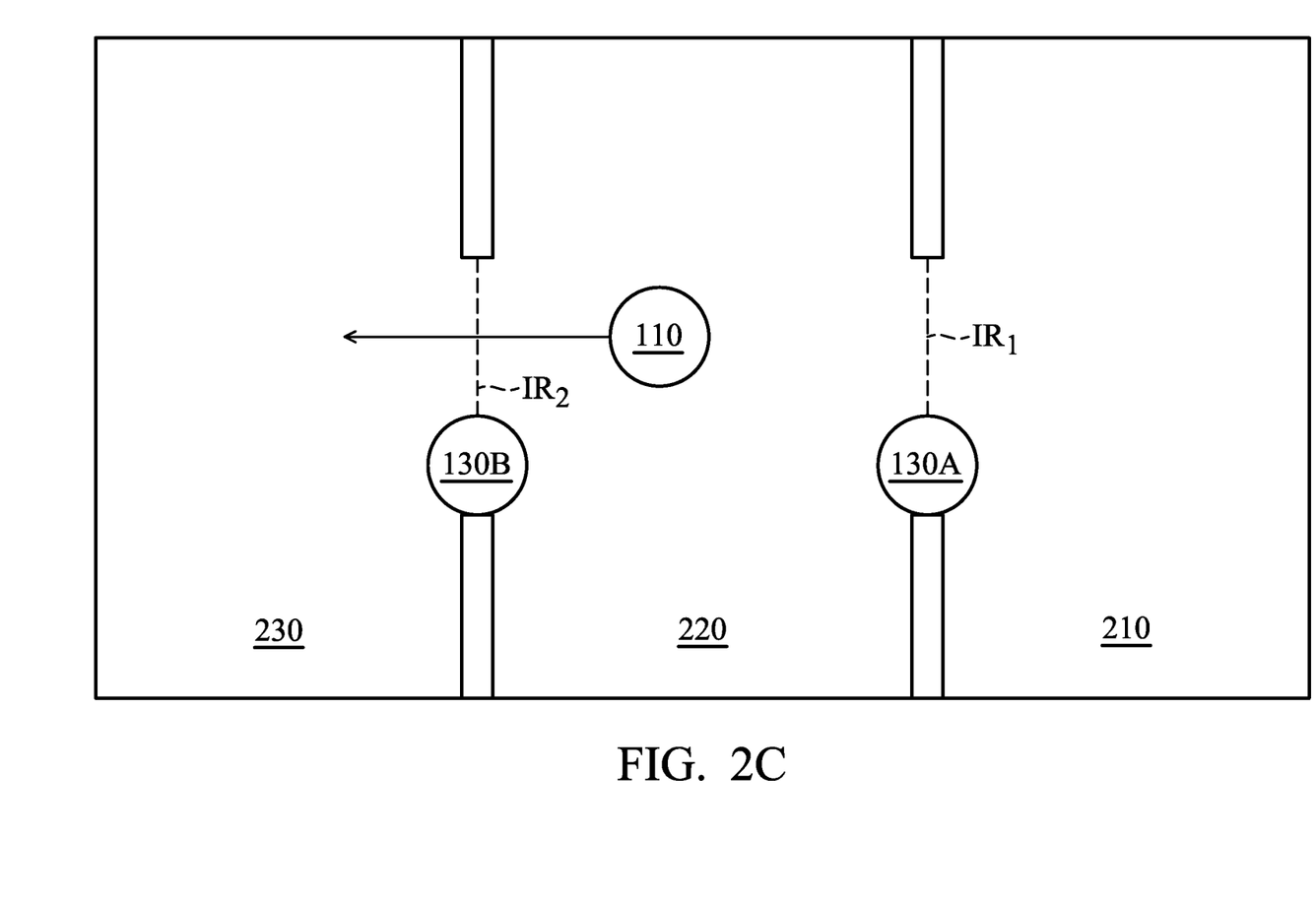

Refer to FIG. 2C, after the cleaning robot 110 finishes the cleaning procedure in the region 220, the cleaning robot 110 emits the encoded ultrasonic wave $UW_2$. When the direction device 130B receives the encoded ultrasonic wave $UW_2$, the direction device 130B emits the direction wireless signal $IR_2$. The direction wireless signal $IR_2$ directs the cleaning robot 110 to exit the region 220. The cleaning robot 110 enters the region 230 according to the direction wireless signal $IR_2$, and then the cleaning robot 110 executes a cleaning procedure in the region 230.

In the above embodiment, since the direction device 130A has already received the encoded ultrasonic wave $UW_2$ once, the direction device 130A does not emit the direction wireless signal $IR_2$. Since the direction device 130A emits the direction wireless signal $IR_1$, the cleaning robot 110 does not enter the region 210 from the region 220.

When the electric quantity of the cleaning robot 110 is insufficient, if the cleaning robot 110 has exited the original region, the cleaning robot 110 emits the encoded ultrasonic wave $UW_3$ to return to the original region, such as region 210.

For example, assume the cleaning robot 110 first executes a cleaning procedure in the region 210 and then executes a cleaning procedure in the region 220. When the electric quantity of the cleaning robot 110 is insufficient, and the cleaning robot 110 is in the region 220, the cleaning robot 110 emits the encoded ultrasonic wave $UW_3$. Because the cleaning robot 110 has not entered the region 230 yet, the direction device 130B has not emitted the direction wireless signal $IR_2$ yet. However, the direction device 130A has already emitted the direction wireless signal $IR_2$ to direct the cleaning robot 110 into the region 220 from the region 210. Thus, only the direction device 130A emits the direction wireless signal $IR_2$ according to the encoded ultrasonic wave $UW_3$ such that the cleaning robot 110 is directed and enters into the original region 210 from the region 220. In this case, assume the direction device 130A has a charging function. The cleaning robot 110 can be charged by the direction device 130A.

Furthermore, the cleaning robot 110 has a counting function. For example, when the cleaning procedure is executed by the cleaning robot 110, and the time for executing the cleaning procedure exceeds 30 minutes, the cleaning robot 110 may emit the encoded ultrasonic wave $UW_2$ to enter another region.

In other embodiments, when the cleaning robot 110 enters a new region, the cleaning robot 110 passes along walls to calculate the size of the new region and to calculate a cleaning time. When the real cleaning time equals to the calculated cleaning time, the cleaning robot 110 emits the encoded ultrasonic wave $UW_2$ to enter another region.

Figure 3:
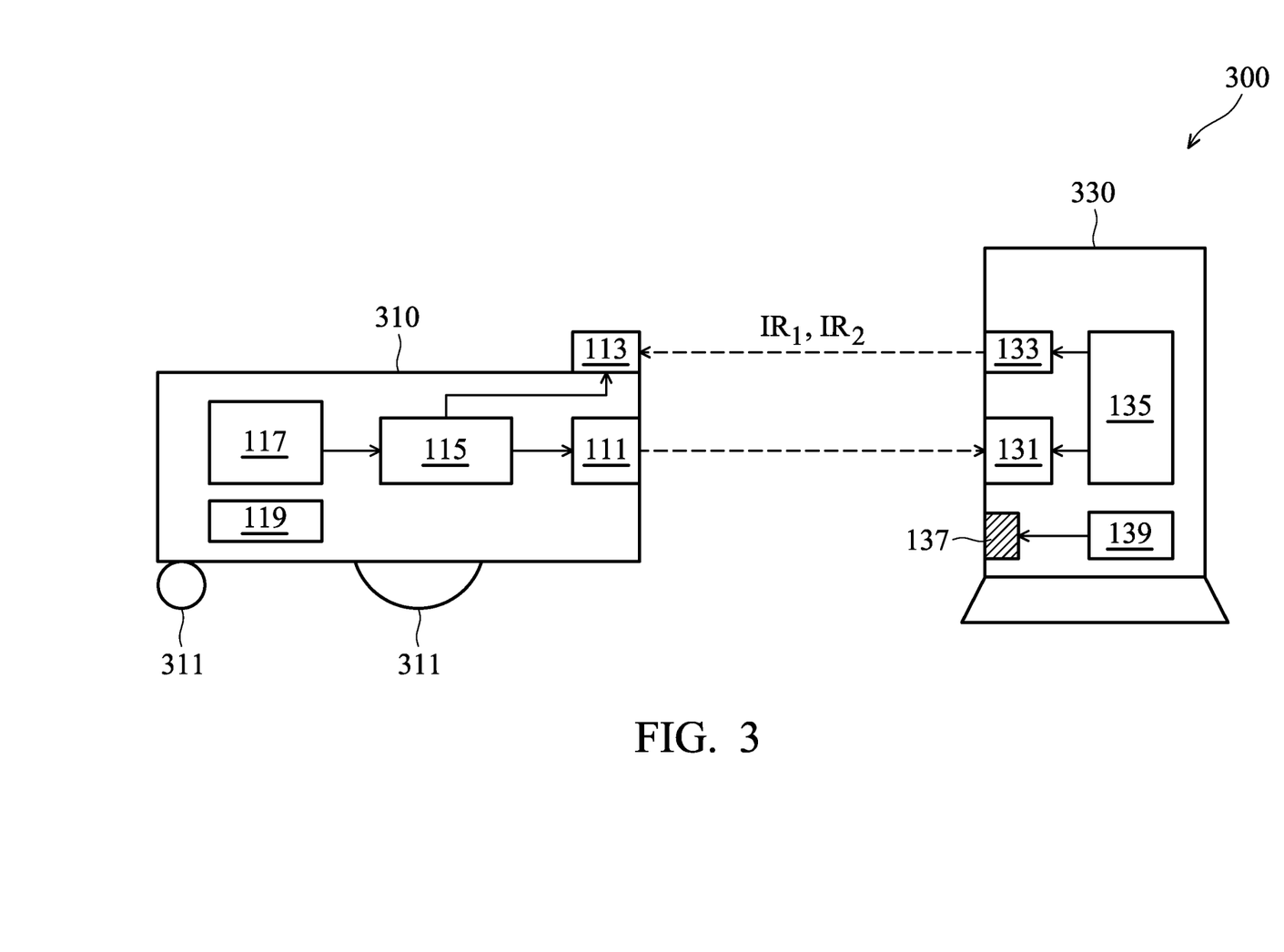
FIG. 3 is a schematic diagram of another exemplary embodiment of an operation system of the invention.

FIG. 3 is a schematic diagram of another exemplary embodiment of the performance system. FIG. 3 is similar to FIG. 1 with the exception that the direction device 300 comprises a charging terminal 137 and a charging unit 139. The charging unit 139 can charge the cleaning robot 310 via the charging terminal 137.

For example, after receiving the direction wireless signal $IR_1$, the cleaning robot 310 moves and is close to the charging terminal 137. Then, the emitting unit 133 emits the direction wireless signal $IR_2$ such that the cleaning robot 310 accurately contacts the charging terminal 137 according to the direction wireless signal $IR_2$. Thus, the cleaning robot 310 can be charged when the cleaning robot 310 accurately contacts the charging terminal 137. At this time, the direction device 330 serves as a dock.

In other embodiments, after receiving the direction wireless signal $IR_1$, the cleaning robot 310 moves and is close to the charging terminal 137. Then, the emitting unit 133 emits the direction wireless signal $IR_2$ to change the traveling route of the cleaning robot 310. The cleaning robot 310 may pass to the left side of the direction device 330 or passes to the right side of the direction device 330. At this time, the direction device 330 serves as a light house.

In addition, the cleaning robot 310 further comprises a rechargeable unit 115, a quantity detection unit 117 and a storage unit 119. The rechargeable unit 115 can be a rechargeable battery and provides power to the emitting unit 111 and the receiving unit 113.

The quantity detection unit 117 detects the electric quantity of the rechargeable unit 115. When the electric quantity of the rechargeable unit 115 is less than a preset value, if the direction device 330 has a charging function, the cleaning robot 310 moves and is close to the direction device 330.

The storage unit 119 stores information relating to the cleaning procedure. When the cleaning robot 310 receives the direction wireless signal $IR_1$, the storage unit 119 is reset or corrected.

For example, the rotating number of the wheels 311 of the cleaning robot 310 is utilized to obtain the position of the cleaning robot 310. In other embodiments, the moving direction of the wheels 311 of the cleaning robot 310 is utilized to obtain the position of the cleaning robot 310. The position of the cleaning robot 310 is stored in the storage unit 119. A cleaning coverage rate of the cleaning robot 310 can be obtained according to the data stored in the storage unit 119.

However, the rotating number of the wheels 311 or the moving direction of the wheels 311 may be influenced when the wheels 311 are slipped. Thus, when the cleaning robot 310 receives the direction wireless signal $IR_1$, The storage unit 119 is reset or corrected to increase accuracy of the cleaning performance.

In summary, the direction device of the invention can serve as one or a combination of a dock, a light house and a virtual wall. When the direction device has a charging function, the direction device can serve as a charging dock of a cleaning robot. Since the cleaning robot passes according to a direction signal emitted by the direction device, the direction device has a light house function. Further, the cleaning robot may determine that the direction device is a wall according to the guidance signal emitted by the direction device. Thus, the direction device has a virtual wall function.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A direction device controlling a traveling route of a cleaning robot, comprising:

a receiving unit receiving a first encoded ultrasonic wave emitted by the cleaning robot;

an emitting unit emitting a wireless signal; and a control unit, which activates the emitting unit to emit a first direction wireless signal to control the traveling route of the cleaning robot when the receiving unit receives the first encoded ultrasonic wave, wherein:

the direction device is separated from the cleaning robot, the emitting unit emits the first direction wireless signal toward to a specific direction and the cleaning robot remains in a first region according to the first direction wireless signal, when the receiving unit receives a second encoded ultrasonic wave emitted by the cleaning robot, the emitting unit emits a second direction wireless signal toward to the specific direction and the cleaning robot leaves the first region and enters to a second region according to the second direction wireless signal, an encoded value of the first direction wireless signal is different from an encoded value of the second direction wireless signal, and when the cleaning robot remains in the second region and the receiving unit receives the second encoded ultrasonic wave emitted by the cleaning robot, the emitting unit emits the first direction wireless signal and does not emit the second direction wireless signal, when the emitting unit receives the second encoded ultrasonic wave for the first time, the emitting unit emits the second direction wireless signal, and when the emitting unit receives the second encoded ultrasonic wave again, the emitting unit emits the first direction wireless signal replacing the second direction wireless signal, and when the receiving unit receives a third encoded ultrasonic wave emitted by the cleaning robot, the emitting unit emits the second direction wireless signal again.

2. The direction device as claimed in claim 1, wherein each of the first and second wireless signals is an ultrasonic wave or an infrared ray.

3. The direction device as claimed in claim 1, wherein when the receiving unit has not received the first encoded ultrasonic wave yet, the control signal de-activates the emitting unit such that the emitting unit does not emit the first wireless signal.

4. The direction device as claimed in claim 1, wherein when the receiving unit has received the first encoded ultrasonic wave, the control unit activates the emitting unit such that the emitting unit emits only one recognition wireless signal.

5. The direction device as claimed in claim 1, wherein after the emitting unit emits the first direction wireless signal, the control unit again activates the emitting unit according to the intensity or the encoded value of the first encoded ultrasonic wave such that the emitting unit emits only one second direction wireless signal.

6. The direction device as claimed in claim 1, wherein the encoded value of the first direction wireless signal is different from the encoded value of the second direction wireless signal, or the intensity of the first direction wireless signal is different from the intensity of the second direction wireless signal.

7. An operation system comprising:
a cleaning robot executing a cleaning procedure and comprising:
a first emitting unit emitting a first encoded ultrasonic wave; and
a direction device comprising:
a receiving unit receiving the first encoded ultrasonic wave;
a second emitting unit emitting at least one wireless signal; and
a control unit, which activates the second emitting unit to emit only one first direction wireless signal to control the cleaning robot when the receiving unit receives the first encoded ultrasonic wave,
wherein:
the direction device is separated from the cleaning robot,
the second emitting unit emits the first direction wireless signal toward to a specific direction and the cleaning robot remains in a first region according to the first direction wireless signal,
when the receiving unit receives a second encoded ultrasonic wave emitted by the cleaning robot, the second emitting unit emits a second direction wireless signal toward to the specific direction and the cleaning robot leaves the first region and enters to a second region according to the second direction wireless signal, an encoded value of the first direction wireless signal is different from an encoded value of the second direction wireless signal, and when the cleaning robot remains in the second region and emits second encoded ultrasonic wave, the second emitting unit emits the first direction wireless signal and does not emit the second direction wireless signal, when the emitting unit receives the second encoded ultrasonic wave for the first time, the emitting unit emits the second direction wireless signal, and when the emitting unit receives the second encoded ultrasonic wave again, the emitting unit emits the first direction wireless signal replacing the second direction wireless signal, and when the receiving unit receives a third encoded ultrasonic wave emitted by the cleaning robot, the emitting unit emits the second direction wireless signal again.

8. The operation system as claimed in claim 7, wherein the at least one wireless signal is an ultrasonic wave or an infrared ray.

9. The operation system as claimed in claim 7, wherein the direction device further comprises:
a charging terminal; and
a charging unit charging the cleaning robot via the charging terminal.

10. The operation system as claimed in claim 9, wherein after the cleaning robot receives the first direction wireless signal, the cleaning robot moves and is close to the charging terminal, and then the second emitting unit emits only one second direction wireless signal to direct the cleaning robot.

11. The operation system as claimed in claim 10, wherein the cleaning robot contacts the charging terminal according to the second direction wireless signal.

12. The operation system as claimed in claim 10, wherein the cleaning robot moves to a right side of the direction device or to a left side of the direction device according to the second direction wireless signal.

13. The operation system as claimed in claim 7, wherein when the receiving unit has not received the first encoded ultrasonic wave yet, the control signal de-activates the second emitting unit such that the second emitting unit does not emit the first wireless signal.

14. The operation system as claimed in claim 7, wherein when the receiving unit has received the first encoded ultrasonic wave, the control unit activates the second emitting unit such that the second emitting unit emits only one recognition wireless signal,
wherein the cleaning robot moves and is close to the direction device according to the recognition wireless signal, and after the second emitting unit emits the recognition wireless signal, the cleaning robot obtains a distance between the cleaning robot and the direction device according to the first direction wireless signal.

15. The operation system as claimed in claim 7, wherein after the cleaning robot finishes the cleaning procedure in the first region, the first emitting unit emits the second encoded ultrasonic wave,
wherein the direction device emits only one second direction wireless signal according to the second encoded ultrasonic wave, and the cleaning robot enters the second region according to the second direction wireless signal.

16. The operation system as claimed in claim 15, wherein after the cleaning robot enters the second region, the direction device again emits the first direction wireless signal and the first emitting unit emits the first encoded ultrasonic wave.

17. The operation system as claimed in claim 16, wherein after the cleaning robot finishes the cleaning procedure in the second region, the first emitting unit emits the third encoded ultrasonic wave, and
   wherein the direction device emits the second direction wireless signal according to the third encoded ultrasonic wave, and the cleaning robot enters the first region according to the second direction wireless signal.

18. The operation system as claimed in claim 16, wherein the cleaning robot comprises:
   a rechargeable unit; and
   a quantity detection unit detecting an electric quantity of the rechargeable unit, wherein when the electric quantity of the rechargeable unit is less than a preset value, the first emitting unit emits the third encoded ultrasonic wave,
   wherein the direction device emits the second direction wireless signal according to the third encoded ultrasonic wave, and the cleaning robot enters the first region according to the second direction wireless signal.

19. The operation system as claimed in claim 7, wherein the cleaning robot further comprises a storage unit, wherein the storage unit stores information relating to the cleaning procedure when the cleaning robot receives the first direction wireless signal, and wherein the stored information is reset or corrected.

20. The operation system as claimed in claim 7, wherein when the cleaning robot receives the first direction wireless signal, the cleaning robot determines that the direction device is a virtual wall.

* * * * *